United States Patent
Hong et al.

(10) Patent No.: US 8,363,267 B2
(45) Date of Patent: Jan. 29, 2013

(54) IMAGE FORMING APPARATUS AND COLOR CONVERTING METHOD THEREOF

(75) Inventors: Jin-kyung Hong, Seoul (KR); Jae-min Shin, Seoul (KR); In-ho Park, Suwon-si (KR); Woo-ri Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 294 days.

(21) Appl. No.: 11/972,905

(22) Filed: Jan. 11, 2008

(65) Prior Publication Data

US 2008/0297817 A1 Dec. 4, 2008

(30) Foreign Application Priority Data

Jun. 1, 2007 (KR) .................. 10-2007-0054085
Dec. 21, 2007 (KR) .................. 10-2007-0135355

(51) Int. Cl.
- G06F 15/00 (2006.01)
- G03F 3/08 (2006.01)
- H04N 1/46 (2006.01)
- H04N 9/04 (2006.01)

(52) U.S. Cl. ......... 358/1.9; 358/518; 358/523; 358/504; 348/273

(58) Field of Classification Search .............. 358/537, 358/474, 518, 1.9, 506, 523; 382/248, 167, 382/180

See application file for complete search history.

(56) References Cited

U.S. PATENT DOCUMENTS

| 5,028,991 | A | * | 7/1991 | Sekizawa et al. | 358/537 |
| 5,136,401 | A | * | 8/1992 | Yamamoto et al. | 358/474 |
| 5,719,956 | A | * | 2/1998 | Ogatsu et al. | 358/523 |
| 5,729,664 | A | * | 3/1998 | Ishikawa | 358/1.9 |
| 5,914,749 | A | * | 6/1999 | Bawolek et al. | 348/273 |
| 5,917,939 | A | * | 6/1999 | Ohta et al. | 358/506 |
| 7,155,066 | B2 | * | 12/2006 | Baharav et al. | 382/248 |
| 7,515,746 | B2 | * | 4/2009 | Pettitt | 358/520 |
| 7,755,817 | B2 | * | 7/2010 | Ho et al. | 358/523 |
| 2004/0233484 | A1 | * | 11/2004 | Seko et al. | 358/523 |
| 2005/0046883 | A1 | * | 3/2005 | Chiba | 358/1.9 |
| 2006/0285747 | A1 | * | 12/2006 | Blake et al. | 382/180 |

FOREIGN PATENT DOCUMENTS

JP 2003-125226 4/2003

OTHER PUBLICATIONS

Korean Office Action issued Feb. 10, 2012 in corresponding Korean Patent Application No. 10-2007-0135355.

* cited by examiner

*Primary Examiner* — Akwasi M Sarpong
(74) *Attorney, Agent, or Firm* — Staas & Halsey LLP

(57) ABSTRACT

An image forming apparatus including a scanning unit to scan an image and to output corresponding digital color coordinates; a determining unit to determine a local color gamut including the digital color coordinates, based on a reference matrix computed from a standard color gamut, which includes the local color gamut, and the plurality of digital color coordinates; a matrix selecting unit to select a color conversion matrix that corresponds to the determined local color gamut; and a computing unit to compute LAB color coordinates based on the selected color conversion matrix and the digital color coordinates. A method of color conversion using the image forming apparatus is also provided.

12 Claims, 10 Drawing Sheets

IMAGE FORMING APPARATUS AND COLOR CONVERTING METHOD THEREOF

CROSS-REFERENCE TO RELATED APPLICATIONS

This application claims the benefit of Korean Application No. 2007-54085, filed Jun. 1, 2007, in the Korean Intellectual Property Office, and Korean Application No. 2007-135355, filed Dec. 21, 2007, in the Korean Intellectual Property Office, the disclosure of which is incorporated herein by reference.

BACKGROUND OF THE INVENTION

1. Field of the Invention

Aspects of the present invention relate generally to an image forming apparatus and a color converting method thereof, and more particularly, to an image forming apparatus for categorizing LAB plane into a plurality of regions, converting color using regional matrices, and outputting a color gamut characteristic, and a color converting method thereof.

2. Description of the Related Art

An image forming apparatus scans an image, for example, text, a photo, or a film image, to convert the image into digital data, so that the digital data can be displayed on a computer screen, and/or be printed by a printer. An image forming apparatus can be a scanner, which generates digital data, a facsimile machine, a copier, or a multi-function unit incorporating all of these functions.

FIG. 1A illustrates an original image before the original image is passed through an image forming apparatus, and FIG. 1B illustrates an output image, of the original image after passing through an image forming apparatus and displayed on a screen. Referring to FIGS. 1A and 1B, grayish parts of the original image are represented on the screen, with a reddish color added thereto.

As explained above, digital data generated by a conventional image forming apparatus is frequently represented either on a screen or on a printing medium, in colors differing from the original colors. This discrepancy of colors is generated due to color-metamerism, as the original image passes through an image forming apparatus. Therefore, an image forming apparatus of improved quality is needed, which minimizes color differences between an original image and a processed image, and which provides improved performance.

SUMMARY OF THE INVENTION

Aspects of the present invention provide an image forming apparatus, which is capable of minimizing color differences between an original image and a processed image and a color converting method thereof.

Aspects of the present invention also provide an image forming apparatus, which determines a piecewise regression that is used in color conversion.

According to aspects of the present invention, an image forming apparatus is provided. The image forming apparatus includes: a scanning unit to scan an image and to output the scanned image as a plurality of digital color coordinates; a determining unit to determine a local color gamut, of a standard color gamut to which the digital color coordinates belong, based on a reference matrix computed from the entire standard color gamut and the plurality of digital color coordinates; a matrix selecting unit to select a color conversion matrix that corresponds to the determined local color gamut, from color conversion matrices corresponding to a plurality of local color gamuts that form the standard color gamut; and a computing unit to compute LAB color coordinates, based on the selected color conversion matrix and the digital color coordinates.

According to aspects of the present invention, the determining unit includes a temporary computing unit to compute temporary LAB color coordinates that correspond to each of the digital color coordinates, based on the reference matrix and the digital color coordinates; and a color gamut determining unit to determine the local color gamut of the standard color gamut, to which the temporary LAB color coordinates belong.

According to aspects of the present invention, the image forming apparatus may further include a color measuring unit to color-measure colors of the image and to output the image as a plurality of LAB color coordinates, and a matrix computing unit to compute the reference matrix and the color conversion matrices with respect to each of the plurality of local color gamuts, based on the plurality of color-measured LAB color coordinates and the plurality of digital color coordinates.

According to aspects of the present invention, the matrix computing unit includes a reference matrix computing unit to compute the reference matrix, which represents a correlation between the entire color-measured LAB color coordinates and the entire digital color coordinates; and a color conversion matrix computing unit to compute the color conversion matrices, corresponding to each of the local color gamuts, from the color-measured LAB color coordinates included in each of the local color gamuts and from the digital color coordinates.

According to aspects of the present invention, the image forming apparatus may further include a storage unit. The reference matrix and the color conversion matrices corresponding to each of the local color gamuts are computed in a designing stage and stored in the storage unit.

According to aspects of the present invention, the local color gamut comprises one or more chromatic regions, and one or more achromatic regions. If a plurality of chromatic regions are provided, parts of the chromatic regions are overlapped with each other.

According to aspects of the present invention, the image forming apparatus may further include a converting unit to convert the computed LAB color coordinates into a displayable and/or a printable signal.

According to aspects of the present invention, the image forming apparatus may further include a comparison unit to compare the LAB color coordinates and the color-measured LAB color coordinates, to compute a color difference value.

According to aspects of the present invention, a color converting method is provided. The color converting method includes: scanning an image and outputting the scanned image as a plurality of digital color coordinates; determining a local color gamut, of a standard color gamut including the digital color coordinates, based on a reference matrix computed from the entire standard color gamut and the plurality of digital color coordinates; selecting a color conversion matrix that corresponds to the determined local color gamut, from color conversion matrices corresponding to each of the plurality of local color gamuts that form the standard color gamut; and computing LAB color coordinates, based on the selected color conversion matrix and the digital color coordinates.

According to aspects of the present invention, the determining of the local color gamut includes: computing temporary LAB color coordinates that correspond to each of the digital color coordinates, based on the reference matrix and the digital color coordinates; and determining the local color gamut of the standard color gamut, to which the temporary LAB color coordinates belong.

According to aspects of the present invention, the color converting method may further include: color-measuring the image and outputting a corresponding plurality of LAB color coordinates; and computing the reference matrix and the color conversion matrices with respect to each of the plurality of local color gamuts, based on the plurality of color-measured LAB color coordinates and the plurality of digital color coordinates.

According to aspects of the present invention, the computing of the color conversion matrices includes: computing the reference matrix, which represents a correlation between the color-measured LAB color coordinates and the digital color coordinates; and computing the color conversion matrix with respect to each of the local color gamuts from the color-measured LAB color coordinates included in each of the local color gamuts and from the digital color coordinates.

According to aspects of the present invention, an image forming apparatus is provided. The image forming apparatus includes: a determining unit to determine a local color gamut, which includes digital color coordinates of a scanned image, from a standard color gamut, which includes a plurality of local color gamuts, based on a reference matrix computed from the standard color gamut and the digital color coordinates; a matrix selecting unit to select a color conversion matrix that corresponds to the local color gamut, from color conversion matrices corresponding to the plurality of local color gamuts; and a computing unit to compute LAB color coordinates, based on the selected color conversion matrix and the digital color coordinates.

According to aspects of the present invention, an image forming apparatus is provided. The image forming apparatus includes: a Gaussian mixture model (GMM) unit to apply more than one GMM, to LAB color coordinates acquired by scanning a training sample image, and to provide color gamut characteristics of the training sample image; and an output unit to output the provided color gamut characteristics.

According to aspects of the present invention, the output unit comprises a display unit to display the provided color gamut characteristics, as a displayable signal, on a screen, and a printing unit to print the provided color gamut characteristics on a printing medium.

According to aspects of the present invention, the GMM unit groups LAB color coordinates of a training sample image, as local color gamuts, which are used to perform a piecewise regression on the training sample image.

According to aspects of the present invention, an image forming apparatus is provided. The image forming apparatus includes: a scanning unit to scan a training sample image; and an output unit to output LAB color coordinates grouped into local color gamuts, which are used to perform a piecewise regression, if a GMM is applied to the LAB coordinates of the sample image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the embodiments, taken in conjunction with the accompanying drawings of which.

DETAILED DESCRIPTION OF THE EMBODIMENTS

Figure 1A:
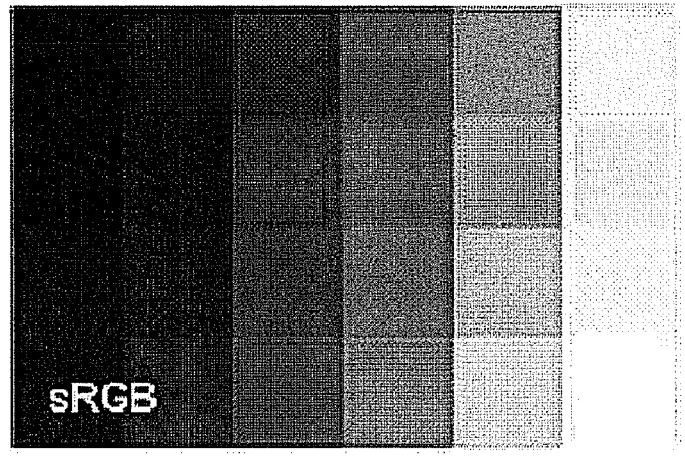
FIG. 1A illustrates an original image before passing through an image forming apparatus.
Figure 1B:
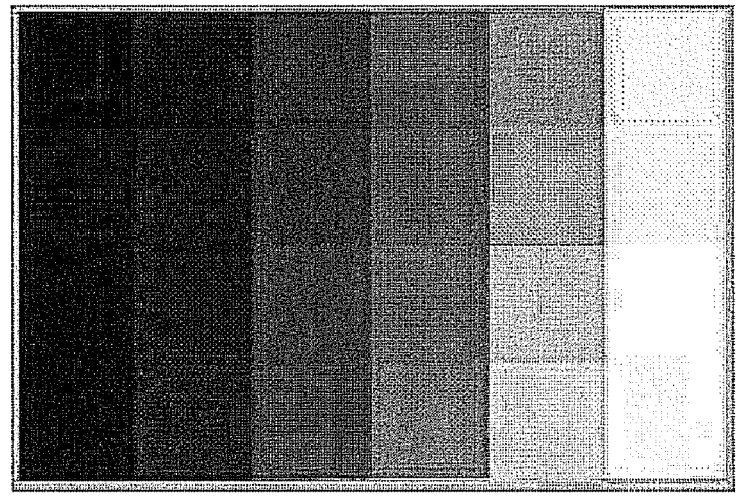
FIG. 1B illustrates a processed image output on a screen, after an original image is passed through an image forming apparatus.

Reference will now be made in detail to the present embodiments, examples of which are illustrated in the accompanying drawings, wherein like reference numerals refer to the like elements throughout. The embodiments are described below in order to explain the present invention by referring to the figures.

Figure 2:
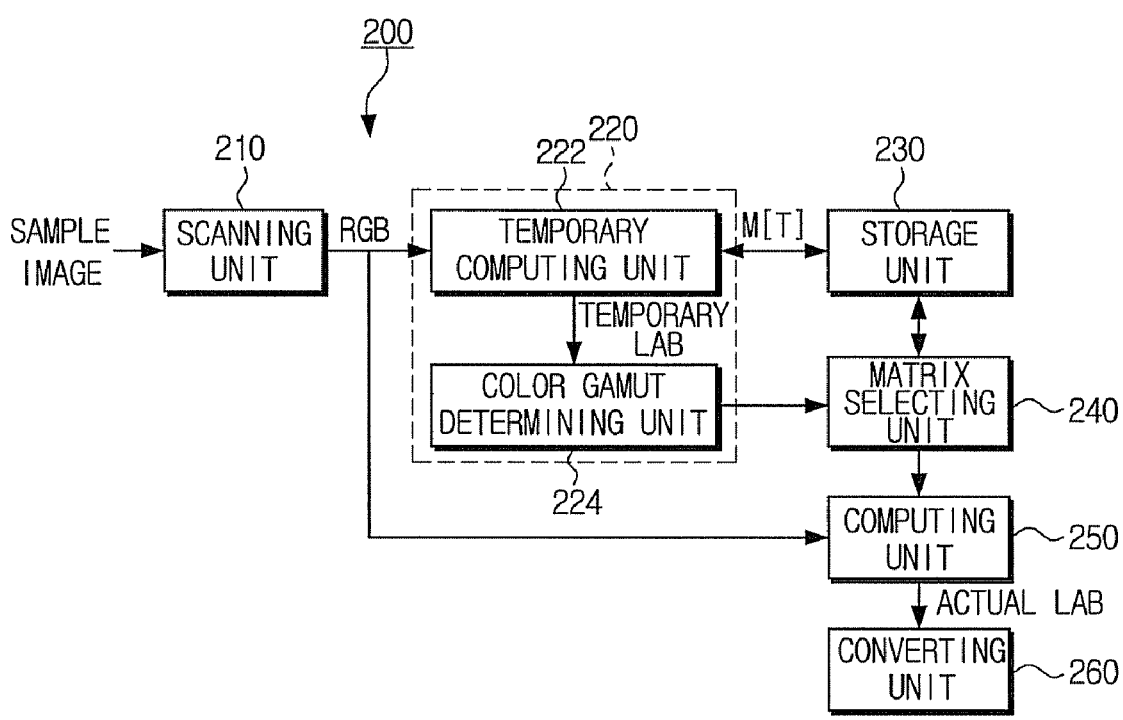
FIG. 2 is a block diagram of an image forming apparatus, according to an exemplary embodiment of the present invention.

FIG. 2 is a block diagram of an image forming apparatus 200, according to an exemplary embodiment of the present invention. Referring to FIG. 2, the image forming apparatus 200 includes a scanning unit 210, a determining unit 220, a storage unit 230, a matrix selecting unit 240, a computing unit 250, and a converting unit 260.

The image forming apparatus 200 includes: a main memory to store programs for various operations; a controller to conduct overall control of the image forming apparatus 200; an interface to communicate with a computer and/or to network with other computers. However, because these are well known in the art, a detailed explanation thereof will be omitted for the sake of brevity. The image forming apparatus 200 scans an image and converts the image into a digital signal. The image forming apparatus 200 can be a scanner, a copier, a facsimile machine, or a multifunctional unit.

The scanning unit 210 scans a sample image and outputs color values of pixels of the image as digital color coordinates. In this exemplary embodiment, as set forth below, RGB coordinates are exemplified as the digital color coordinates. However, this should not be understood as limiting, as other types of color coordinates can be used.

The storage unit 230 stores a reference matrix M[T] used by the determining unit 220, and a plurality of color conversion matrices (M[G], M[C1], M[C2], M[C3], M[C4]) used by the matrix selecting unit 240. The color conversion matrices (M[G], M[C1], M[C2], M[C3], M[C4]) correspond to local color gamuts, which are included in a standard color gamut.

The reference matrix M[T], and the plurality of color conversion matrices (M[G], M[C1], M[C2], M[C3], M[C4]) are computed when configuring the image forming apparatus 200, using standard charts having a plurality of colors. The reference matrix M[T], and the plurality of color conversion matrices (M[G], M[C1], M[C2], M[C3], M[C4]) are used in color space conversion. Specifically, The color conversion matrices (M[G], M[C1], M[C2], M[C3], M[C4]) are computed with respect to each of the plurality of local color gamuts constituting the standard color gamut. The reference matrix M[T] is computed with respect to the entire standard gamut. These operations will be explained in more detail below with reference to FIGS. 3 and 5.

The determining unit 220 determines a local color gamut, including the RGB coordinates, based on the reference matrix M[T], which is computed based on the standard color gamut, and based on the RGB coordinates output from the scanning unit 210. Specifically, the determining unit 220 computes a matrix operation using the reference matrix M[T] and the RGB coordinates, and selects the local color gamut of the standard color gamut, including the RGB coordinates, using the result of the matrix operation. To this end, the determining unit 220 includes a temporary computing unit 222 and a color gamut determining unit 224.

The temporary computing unit 222 computes the matrix operation using the previously computed reference matrix M[T] and the respective RGB coordinates, to render temporary LAB color coordinates that correspond to each of the RGB coordinates. The temporary computing unit 222 outputs the temporary LAB color coordinates to the color gamut determining unit.

The LAB color coordinates are a color model developed by the International Commission on Illumination (CIE), and include brightness information. LAB color coordinates express colors in an independent manner, irrespective of a monitor or a printer, and have a color gamut which encompasses RGB and CMYK. LAB color coordinates are frequently used in an intermediate stage, to convert RGB into CMYK or into sRGB, the standard color specification of a monitor.

The color gamut determining unit 224 determines the local color gamut of the standard color gamut, which includes the temporary LAB color coordinates. The color coordinates of the standard color gamut are the LAB color coordinates, which are standardized by the CIE. Accordingly, the color gamut determining unit 224 maps the temporary LAB color coordinates against the standard color gamut, to select the local color gamut that includes the temporary LAB color coordinates.

Figure 3:
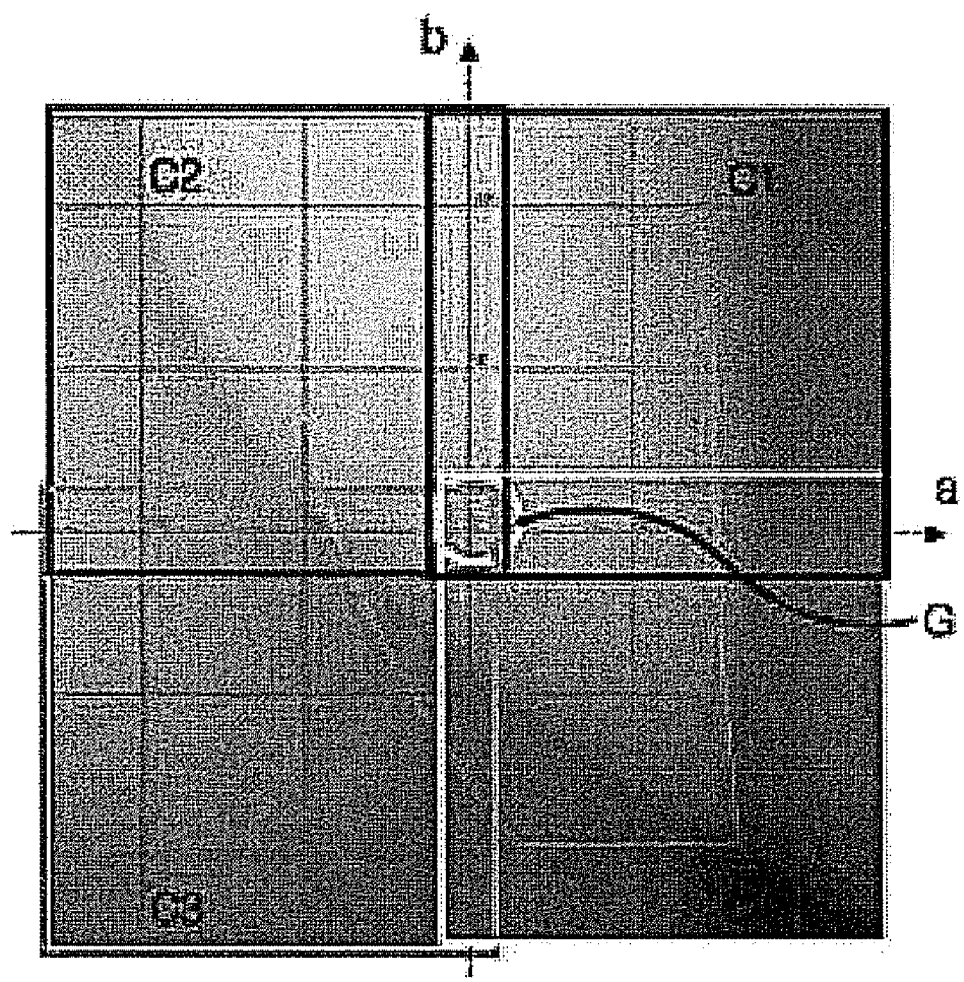
FIG. 3 illustrates a standard color gamut for use in a CIELAB color space.

FIG. 3 illustrates the standard LAB-Plane (standard LAB color space), which is the standard color gamut used in CIELAB, according to an exemplary embodiment of the present invention. Referring to FIG. 3, the standard color gamut is classified into a plurality of local color gamuts, including, an achromatic gamut G, and a plurality of chromatic gamuts (C1, C2, C3, C4) for a piecewise regression.

The chromatic gamuts (C1, C2, C3, C4) may overlap one another, by predetermined areas, so as to express a continuous color gamut among the boundaries of the standard color gamut.

The chromatic color gamuts (C1, C2, C3, C4) may be classified as a reddish gamut, a greenish gamut, and a bluish gamut, and may have a variety of configurations, such as, a rectangle, a sector form, and a triangle. The achromatic gamut G may also be classified into a plurality of sub-gamuts.

The achromatic gamut G has delta chroma smaller than 10, in FIG. 3. The plurality of chromatic gamuts overlap with each other at the boundaries thereof, by predetermined areas. It is desirable that the chromatic gamut have an unlimited delta chroma and size. The delta chroma may be computed by $\sqrt{a^2+b^2}$, where a and b refer to an axis a and an axis b of the CIELAB color coordinates. Both of the 'a' and 'b' range between −128 and 128.

Referring back to FIG. 2, the matrix selecting unit 240 selects from the storage unit 230 a color conversion matrix corresponding to the local color gamut, which is determined by the color gamut determining unit 224. The color conversion matrix is selected from among color conversion matrices (M[G], M[C1], M[C2], M[C3], M[C4]), for a color space conversion computed with respect to each of the local color gamuts (C1, C2, C3, C4).

The computing unit 250 computes LAB color coordinates, by using the color conversion matrix selected by the matrix selecting unit 240 and the RGB coordinates. That is, the computing unit 250 computes LAB color coordinates corresponding to the RGB coordinates, using the color conversion matrix corresponding to the local color gamut, which includes the RGB coordinates acquired by the scanning unit 210. In the description set forth below, the LAB color coordinates computed by the computing unit 250 will be referred to as actual LAB color coordinates, for the sake of convenience of explanation.

The converting unit 260 performs a post-processing operation, in which the computed actual LAB color coordinates are converted into a display signal and/or print signal. For example, when employed in a copier having a print engine, the converting unit 260 converts the actual LAB color coordinates into CMYK color coordinates, by using a color conversion algorithm. When the image forming apparatus 200 is connected with a computer, the converting unit 260 converts the actual LAB color coordinates into sRGB coordinates suitable for a monitor of a computer.

Figure 4:
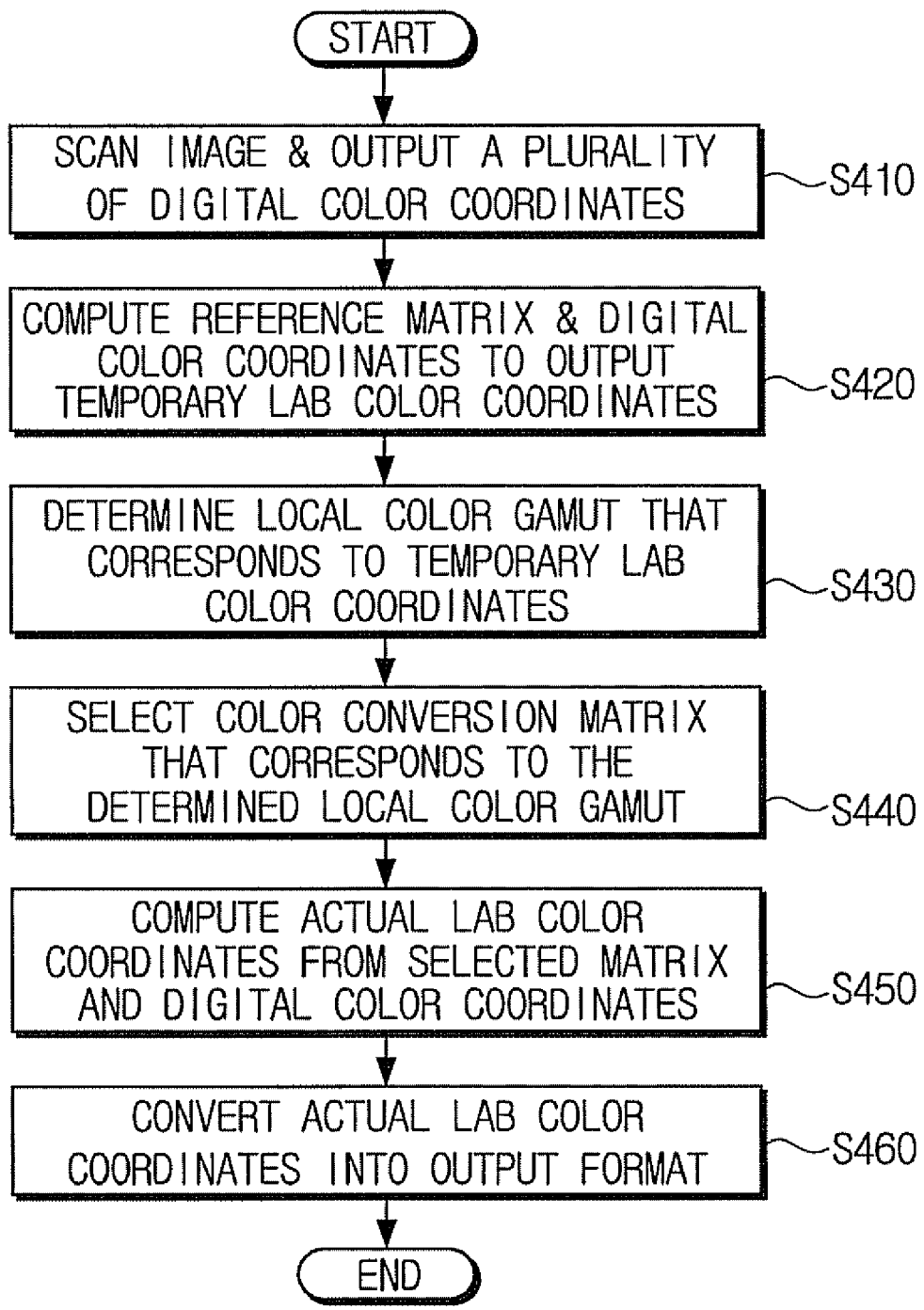
FIG. 4 is a flowchart of a color converting method using the image forming apparatus illustrated in FIG. 2, according to an exemplary embodiment of the present invention.

FIG. 4 is a flowchart of a color converting method involving the image forming apparatus 200 of FIG. 2, according to an exemplary embodiment of the present invention. Referring to FIG. 4, the scanning unit 210 scans an image, for example, an image laid on a document plate (not shown), and outputs a plurality of digital color coordinates (S410). The plurality of digital color coordinates represent pixels. The plurality of digital color coordinates may be RGB coordinates, for example.

The temporary computing unit 222 uses the reference matrix M[T], which is previously computed based on the entire standard color gamut and the digital color coordinates output from operation at S410, to compute temporary LAB color coordinates that correspond to each of the digital color coordinates (S420).

The color gamut determining unit 224 determines a local color gamut of the standard color gamut illustrated in FIG. 3 (S430). The local color gamut corresponds to the temporary LAB color coordinates computed in operation S420.

The matrix selecting unit 240 selects from the storage unit 230 a color conversion matrix that corresponds to the local color gamut of operation S430, from among the color conversion matrices (M[G], M[C1], M[C2], M[C3], M[C4]) (S440). The color conversion matrices (M[G], M[C1], M[C2], M[C3], M[C4]) are previously computed when configuring the image forming apparatus 200 and correspond to each of the local color gamuts (C1, C2, C3, C4).

The computing unit 250 computes actual LAB color coordinates, using the color conversion matrix selected in operation S440 and the RGB coordinates output in operation S410 (S450).

The converting unit 260 converts the actual LAB color coordinates of operation S450 into an output format, such as, sRGB coordinates or CMYK color coordinates (S460).

According to the exemplary embodiment explained above, a local color gamut, which includes scanned data (that is, each of the digital color coordinates), is determined, and a color conversion is performed using the color conversion matrix that corresponds to the determined local color gamut. As a result, an image is displayed on a monitor and/or on a printing medium in its original colors.

Figure 5:
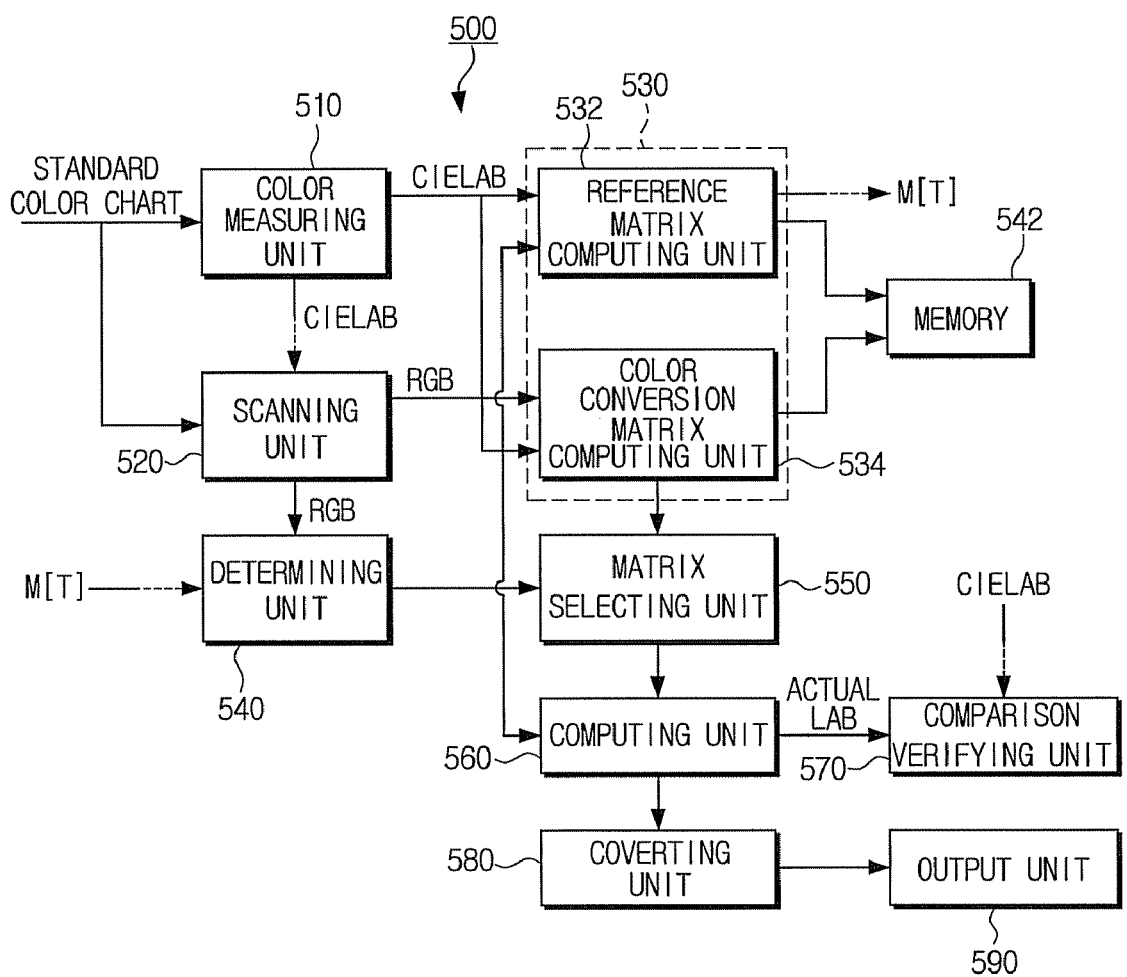
FIG. 5 is a block diagram of an image forming apparatus to acquire a reference matrix and color conversion matrix, to be stored in the storage unit illustrated in FIG. 2.

FIG. 5 is a block diagram of an image forming apparatus 500 to acquire a reference matrix and a color conversion matrix to be stored in the storage unit of FIG. 2. Referring to FIG. 5, the image forming apparatus 500 includes a color-measuring unit 510, a scanning unit 520, a matrix computing unit 530, a determining unit 540, a matrix selecting unit 550, a computing unit 560, a comparison verifying unit 570, a converting unit 580, and an output unit 590. The scanning unit 520, the determining unit 540, the matrix selecting unit 550, the computing unit 560 and the converting unit 580 of FIG. 5, operate almost in the same manner as the scanning unit 210, the determining unit 220, the matrix selecting unit 240, the computing unit 250 and the converting unit 260 of FIG. 2. Therefore, a detailed explanation of these elements is omitted for the sake of brevity.

In a configuration stage, a designer uses a standard color chart to obtain a reference matrix and a color conversion matrix. The standard color chart may include a standardized color chart, such as, the P0I chart, the KODAK chart, the AGFA chart, and the Q60 chart. The standard color chart may additionally include separate gray values, so that gray levels of the colors of the standard color chart can be distributed linearly. The colors included in the standard color chart are referred to as training targets. If a designer selects one of the above charts, a color of the selected chart, or the selected chart itself, may be a training target. The designer is aware of numeric values of the RGB coordinates that correspond to the training targets.

The color-measuring unit 510 color-measures each of the training targets, and outputs reference LAB color coordinates that correspond to each of the training targets, to the matrix computing unit 530 and the comparison verifying unit 570. For example, the color-measuring unit 510 color-measures the known RGB coordinates of the training targets, and acquires the color-measured data (reference LAB color coordinates).

The scanning unit 520 scans a standard color chart, and outputs digital color coordinates, which correspond to each of the training targets, to the matrix computing unit 530, the determining unit 540, and the computing unit 560. The digital color coordinates may be, for example, expressed as RGB coordinates, but this example should not be construed as limiting, as other types of coordinates can be used.

The matrix computing unit 530 uses the color-measured LAB color coordinates and the scanned digital color coordinates, to compute the reference matrix M[T], and the color conversion matrices (M[G], M[C1], M[C2], M[C3], M[C4]) of each of the local color gamuts. To this end, the matrix computing unit 530 can include a reference matrix computing unit 532 and a color conversion matrix computing unit 534.

The reference matrix computing unit 532 computes the reference matrix M[T], which represents a correlation between the color-measured LAB color coordinates and the digital color coordinates. That is, the reference matrix M[T] is acquired by performing a regression on the entire standard color gamut, with respect to all of the colors of the standard chart.

The color conversion matrix computing unit 534 classifies the color-measured LAB color coordinates into local color gamuts that include each of the color-measured LAB color coordinates, and then computes the color conversion matrices (M[G], M[C1], M[C2], M[C3], M[C4]), which correspond to the local color gamuts, based on the color-measured LAB color coordinates of each of the local color gamuts, and the corresponding digital color coordinates. That is, the color conversion matrix computing unit 534 performs a piecewise regression on the color-measured LAB color coordinates and the digital color coordinates corresponding to the same local color gamut, by, for example, a (3×14) regression, to compute the color conversion matrices (M[G], M[C1], M[C2], M[C3], M[C4]).

The color conversion matrices (M[G], M[C1], M[C2], M[C3], M[C4]) represent a correlation between the digital color coordinates and the LAB color coordinates, both of which correspond to the same local color gamut. The reference matrix M[T], and the color conversion matrices (M[G], M[C1], M[C2], M[C3], M[C4]) are computed by a known technique, and therefore, this will not be explained, for the sake of brevity.

The color-measured LAB color coordinates of each of the training targets and the RGB coordinates are classified into local color gamuts, and color conversion matrices (M[G], M[C1], M[C2], M[C3], M[C4]) are computed for each of the local color gamuts. The computed color conversion matrices (M[G], M[C1], M[C2], M[C3], M[C4]) and the reference matrix M[T] are then stored in a memory 542.

The determining unit 540 computes the reference matrix M[T], which is computed from the entire standard color gamut and the RGB coordinates output from the scanning unit 520, to compute temporary LAB coordinates that correspond to each of the RGB coordinates. The determining unit 540 determines the local color gamut, to which the temporary LAB color coordinates belong, based on the standard color gamut illustrated in FIG. 3.

The matrix selecting unit 550 selects a color conversion matrix that corresponds to the local color gamut determined by the determining unit 540, from among the color conversion matrices (M[G], M[C1], M[C2], M[C3], M[C4]), which are computed for color space conversion by the conversion matrix computing unit 530. The color space conversion refers to the conversion from RGB color coordinates into the CIELAB color coordinates.

The computing unit 560 computes actual LAB color coordinates, using the color conversion matrix selected by the matrix selecting unit 550, and the digital color coordinates output from the scanning unit 520. That is, the computing unit 560 computes the actual LAB color coordinates, using the color conversion matrix that corresponds to the digital color coordinates from the scanning unit 520.

The comparison verifying unit 570 compares the computed actual LAB color coordinates with the color-measured LAB color coordinates of the color-measuring unit 510, computes a color difference ΔE, between the actual LAB color coordinates and the color-measured LAB color coordinates. The comparison verifying unit determines whether the color-measured LAB color coordinates from the training targets constitute a greatly improved representation with respect to the conventional technique, based on the ΔE result.

Table 1 below shows the color differences in each of the local color gamuts, obtained as regression results from the image forming apparatus 500.

| Local color gamuts | Piecewise Regression | | | | | | Conventional Regression |
|---|---|---|---|---|---|---|---|
| | G | C1 | C2 | C3 | C4 | All | All |
| Color difference average | 0.7 | 2.03 | 2.21 | 1.75 | 2.22 | 1.89 | 5.96 |
| Maximum color difference | 2.65 | 6.28 | 10.14 | 5.38 | 12.34 | 12.34 | 22.64 |
| Number of samples | 72 | 320 | 257 | 225 | 263 | 1137 | 576 |

The 'piecewise regression' relates to a computing color conversion matrix, resulting from the regressions performed by the color conversion matrix computing unit 534, with respect to each of the local color gamuts (G, C1, C2, C3, C4). The conventional regression relates to a computing color conversion matrix, resulting from the regression performed using the entire standard color gamut. The local color gamuts (G, C1, C2, C3, C4) are classified from the standard color gamut as illustrated in FIG. 3, and the Number of samples represents the number of training targets in each of the local color gamuts. The total number of training targets is 1137.

The color difference average represents color differences between the color-measured LAB color coordinates of the training targets of each of the local color gamuts, and the actual LAB color coordinates computed by the computing unit 560. In Table 1, the color difference average of all of the local color gamuts is 1.89, which is greatly reduced from the 5.96 color difference average found in the conventional technique.

The converting unit 580 performs a post-processing operation, in which the actual LAB color coordinates from the computing unit 560 are converted into a displayable signal (sRGB coordinates) and/or a printable signal (CMYK color coordinates).

The output unit 590 displays an image on a screen and/or prints an image on a printing medium, using the sRGB coordinates and/or the CMYK color coordinates output from the converting unit 580.

Figure 6:
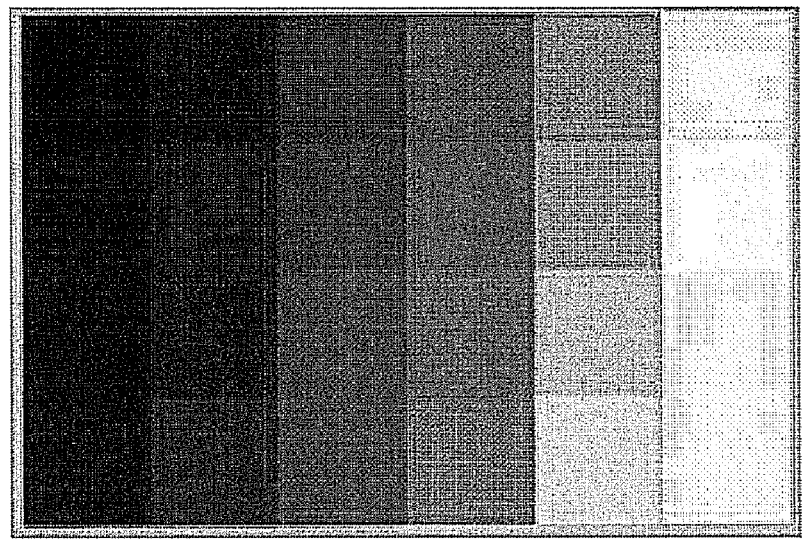
FIG. 6 shows the image of FIG. 1A output on a screen of the output unit of FIG. 5.

FIG. 6 illustrates an image representation of the image of FIG. 1A output to a screen by the output unit 590. Referring to FIGS. 1A and 6, the printed image has almost the same colors as the original image.

Figure 7A:
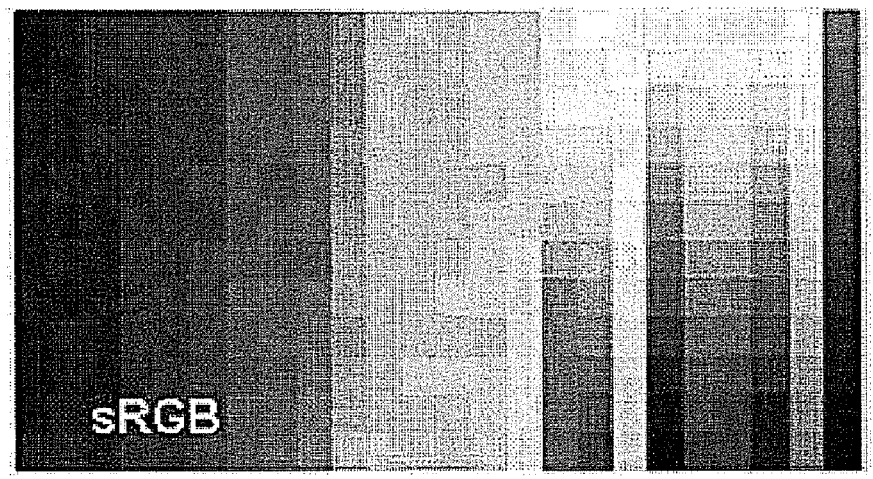
FIG. 7A shows an image having a testing target, which has colors other than colors used in the training target used in the image forming apparatus of FIG. 5.
Figure 7B:
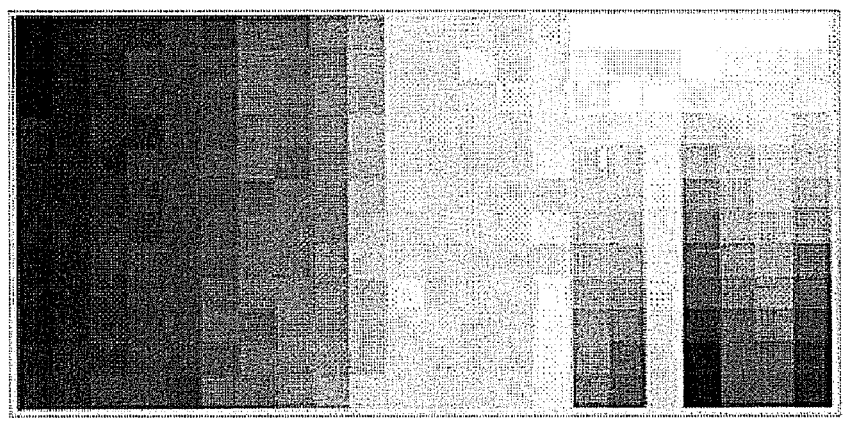
FIG. 7B shows an image on a monitor, which is the result of scanning the testing the target of FIG. 7A and color-converting the target by a conventional method.
Figure 7C:
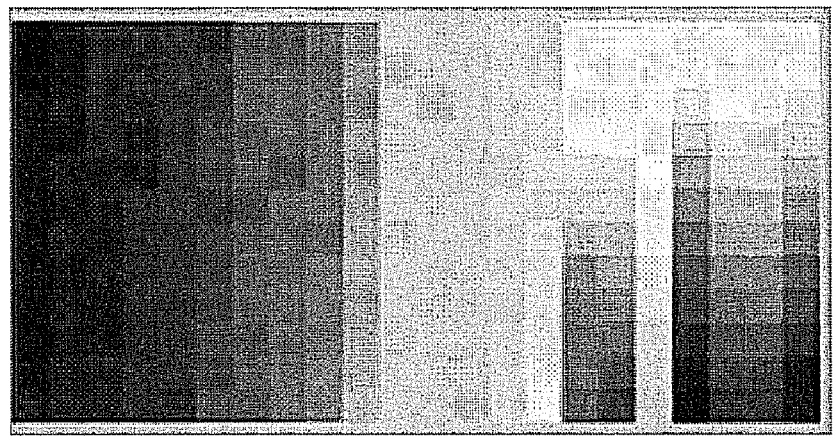
FIG. 7C shows an image on a monitor, which is the result of scanning the testing target of FIG. 7A and color-converting the image, according to an exemplary embodiment of the present invention.

FIG. 7A shows an image having a testing target, which includes colors other than the colors of the training target used in the image forming apparatus 500, of FIG. 5, FIG. 7B shows an image on a monitor which is the result of scanning the testing target of FIG. 7A and color-converting the image by a conventional art method, and FIG. 7C shows an image on a monitor, which is the result of scanning the testing target of FIG. 7A and color-converting the image, according to an exemplary embodiment of the present invention. Referring to FIGS. 7A to 7C, the color-converted testing targets, according to an exemplary embodiment of the present invention, are in clearer and more similar color representation than those in FIG. 7B.

As explained above, with an image forming apparatus, according to the exemplary embodiments of the present invention, digital data acquired by scanning is converted into CIELAB color coordinates, and in this process, the local color gamut including the digital data is determined based on the LAB-Plane, and the digital data is converted into LAB color coordinates, using the color conversion matrix that corresponds to the determined local color gamut. By minimizing the color differences before and after the scanning, an image is more accurately represented.

Figure 8:
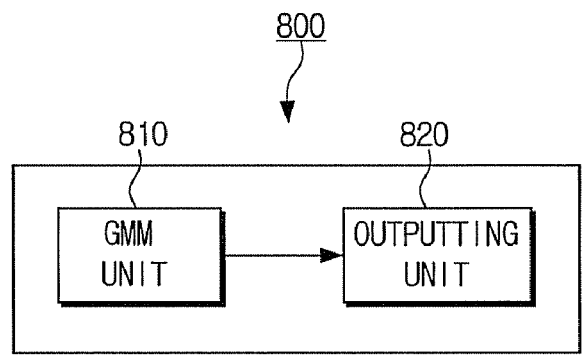
FIG. 8 is a block diagram of an image forming apparatus, according to an exemplary embodiment of the present invention.

FIG. 8 is a block diagram of an image forming apparatus 800, according to an exemplary embodiment of the present invention. The image forming apparatus 800 applies a Gaussian mixture model (GMM) to the LAB color coordinates, which are generated from a piecewise regression of an image, and outputs color gamuts characteristics of the image.

Figure 9A:
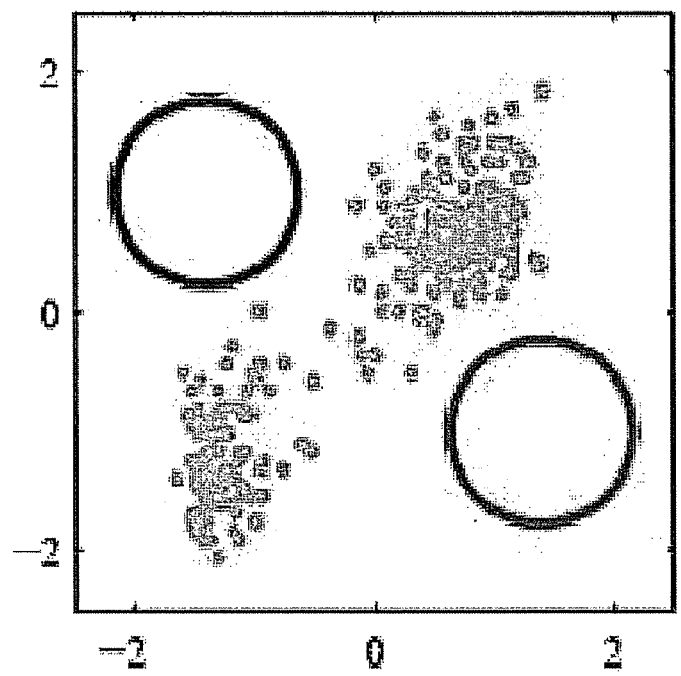
FIG. 9A illustrates an example of an A-B Plane.
Figure 9B:
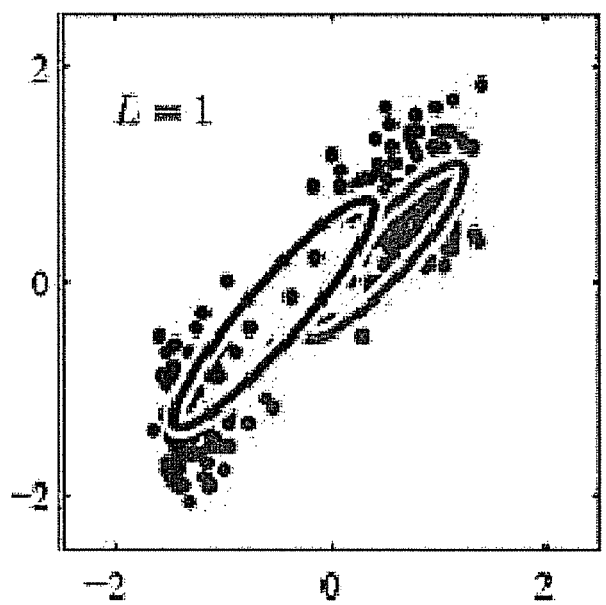
FIG. 9B illustrates an example of a result after applying a Gaussian mixture model (GMM) once.
Figure 9C:
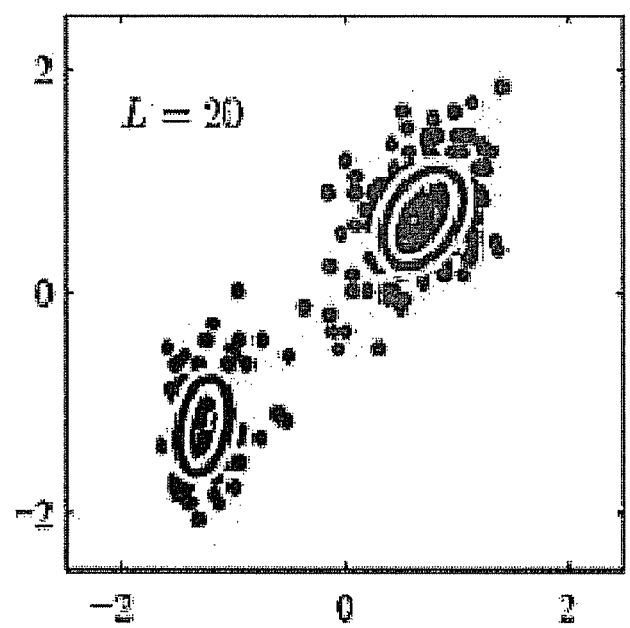
FIG. 9C illustrates an example of a result after applying a Gaussian mixture model (GMM) twenty times.

The GMM is used for an intensive density estimation, which is a published technique. Therefore, a detailed description of the technique will be omitted. FIG. 9A illustrates an example of an A-B Plane, FIG. 9B illustrates an example of a result the application of a Gaussian mixture model (GMM) once, and FIG. 9C illustrates an example of a result of the application of a Gaussian mixture model (GMM) twenty times, where L' represents a number of times the GMM is applied. Referring to FIG. 9A to 9C, whenever the GMM is applied, the color coordinates of A-B plane are categorized into groups having similar color characteristics.

The image forming apparatus 800 includes a Gaussian mixture model (GMM) unit 810 and an outputting unit 820. Herein, a training sample image (a training target) will be explained as an example of an image, although other images, in addition to the training sample image, may also be used, to more accurately compare the regressions used by the image forming apparatus 200 of FIG. 2, or by other image forming apparatuses (not shown).

The training sample image may be one of the standardized charts, such as, the POI chart, the KODAK chart, the AGFA chart, or the Q60 chart. When the GMM is applied, areas are precisely divided on the LAB plane, because of the piecewise regression characteristics. Therefore, the characteristics of the training sample image are readily and accurately recognized.

The GMM unit 810 applies more than one GMM of the LAB color coordinates acquired by scanning the training sample image, and provides the color gamut characteristics of the training sample image. Specifically, the GMM unit 810 groups the LAB color coordinates of the training sample image, into local color gamuts, which are used to perform the piecewise regression.

When the training sample image is scanned by the scanning unit 210 of FIG. 2, the scanned image is used to perform the piecewise regression, through the determining unit 220, the matrix selecting unit 240, and the computing unit 250, to produced actual LAB coordinates, corresponding to the training sample image. The GMM unit 810 applies the GMM to the actual LAB coordinates. The GMM unit 810 provides modeling characteristics reflecting the piecewise regression.

The outputting unit 820 outputs the characteristics provided by the GMM unit 810. For example, the outputting unit 820 converts the characteristics provided by the GMM unit 810 into a displayable signal, and outputs the converted signal to a display device, or prints the provided characteristics onto a printing medium.

Figure 10A:
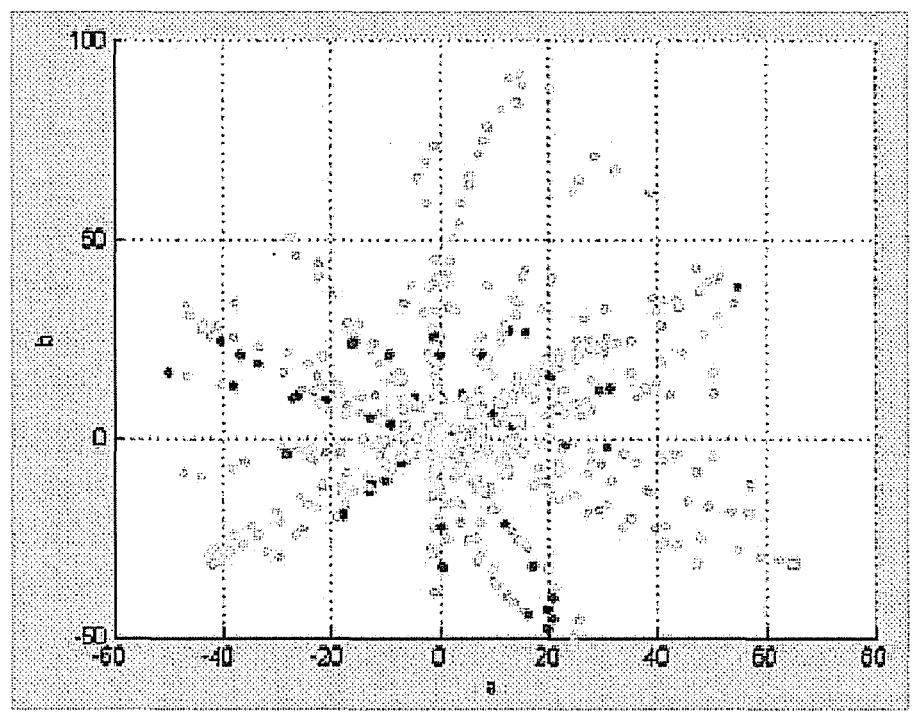
FIG. 10A illustrates LAB plane of a training sample image output through the image forming apparatus of FIG. 2.
Figure 10B:
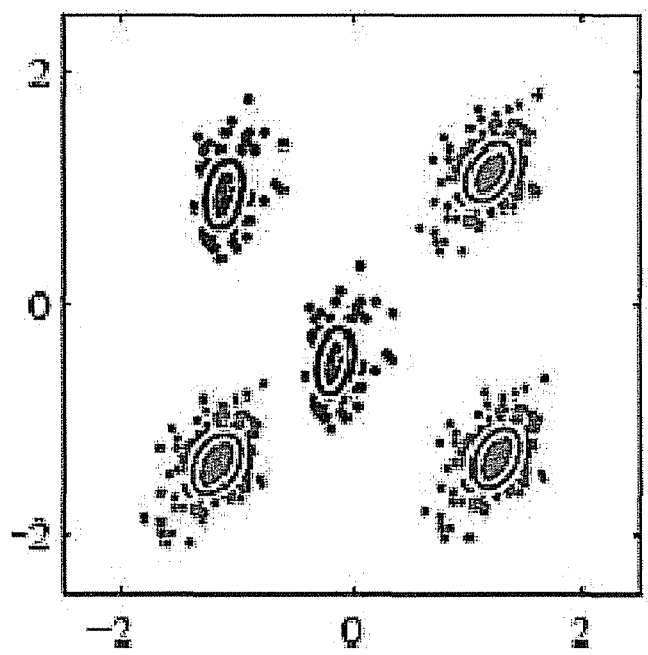
FIG. 10B illustrates color gamuts of a color coordinate of the LAB plane of FIG. 10A.

FIG. 10A illustrates LAB plane of a training sample image output through the image forming apparatus of FIG. 2, and FIG. 10B illustrates color gamuts of a color coordinate of the LAB plane of FIG. 10A. Referring to FIGS. 10A and 10B, the LAB plane and color gamut characteristics may be displayed as colors corresponding to five local color gamuts, but the LAB plane and color gamut characteristics are shown as gray levels, for convenience of description.

If the color coordinates, of the LAB plane of the training sample image, are the same as that of the LAB plane of FIG. 10A, and the GMM unit 810 applies the GMM to the LAB plane of FIG. 10A more than once, and the output unit 820 outputs the result of grouping, which, as illustrated in FIG. 10B, includes five grouping areas. In the case of FIG. 2, as the piecewise regression is performed using the five local color gamuts, as illustrated in FIG. 3, the GMM unit 810 groups the LAB coordinates of the training sample image into five areas. FIG. 10B is merely an example of the color gamut characteristics, and is thus, unnecessary to output when the GMM is applied to FIG. 10A.

The image forming apparatus 800 may be used to determine whether other image forming apparatuses (not shown) apply the aspects of the present invention, as applied to the image forming apparatuses 200 and 500 of FIGS. 2 and 5. In particular, an experimenter scans the sample image scanned by the image forming apparatus 200, using the other image forming apparatus (not shown), and acquires the LAB coordinates by color-measuring the scanned result. As the color-measurement of the LAB coordinates is a disclosed art, a detailed description herein, is omitted. The experimenter applies the GMM to the color-measured LAB coordinates, via the image forming apparatus 800, more than once, and acquires the color gamut characteristics of the color-measured LAB coordinates.

If the color gamut characteristics, of the color-measured LAB coordinates output through the outputting unit 820, are the same as that of FIG. 10B, or are within a predefined error tolerance, the experimenter may determine that the other image forming apparatuses (not shown) uses the piecewise regression applied by the image forming apparatuses 200 and 500.

The image forming apparatus 800, explained with reference FIGS. 8 through 10B, may be embodied as a device included in the image forming apparatuses 200 and 500.

The image forming apparatus, according to exemplary embodiments of the present invention, may include: a scanning unit to scan a training sample image; an output unit to output LAB color coordinates grouped as local color gamuts, which are used when a training sample image is used to perform a piecewise regression, if a GMM is applied to the LAB.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
    a scanning unit to scan an image and to output corresponding digital color coordinates;
    a determining unit to compute a matrix operation using a reference matrix computed from a standard color gamut and the digital color coordinates, and to determine a local color gamut including the digital color coordinates, from the standard color gamut including a plurality of local color gamuts using the result of the matrix operation;
    a matrix selecting unit to select a color conversion matrix that corresponds to the local color gamut, from color conversion matrices corresponding to the plurality of local color gamuts;
    a computing unit to compute LAB color coordinates based on the selected color conversion matrix and the digital color coordinates;
    a storage unit to pre-store the reference matrix and the color conversion matrices; and
    a color measuring unit to color-measure the image and to output corresponding color-measured LAB color coordinates,
    wherein the reference matrix represents a correlation between the color-measured LAB color coordinates and the digital color coordinates.

2. The image forming apparatus of claim 1, wherein the determining unit comprises:
    a temporary computing unit to compute temporary LAB color coordinates corresponding to each of the digital color coordinates, based on the reference matrix and the digital color coordinates; and
    a color gamut determining unit to determine the local color gamut, such that the determined local color gamut comprises the temporary LAB color coordinates.

3. The image forming apparatus of claim 1, further comprising:
    a matrix computing unit to compute the reference matrix and the color conversion matrices corresponding to the plurality of local color gamuts, based on the color-measured LAB color coordinates and the digital color coordinates.

4. The image forming apparatus of claim 3, wherein the matrix computing unit comprises:
    a reference matrix computing unit to compute the reference matrix; and
    a color conversion matrix computing unit to compute the color conversion matrices according to the color-measured LAB color coordinates corresponding to each of the plurality of local color gamuts and the digital color coordinates.

5. The image forming apparatus of claim 1, wherein the plurality of local color gamuts comprise one or more chromatic regions, and one or more achromatic regions, and if the local color gamuts comprise a plurality of the chromatic regions, portions of the chromatic regions are overlapped with each other in the standard color gamut.

6. The image forming apparatus of claim 1, further comprising a converting unit to convert the LAB color coordinates into a display signal and/or print signal.

7. A color converting method, comprising:
    scanning an image and outputting corresponding digital color coordinates;

computing a matrix operation using a reference matrix computed from a standard color gamut and the digital color coordinates, determining a local color gamut of a standard color gamut, using the result of the matrix operation, wherein the standard color gamut comprises a plurality of local color gamuts, and the determined local color gamut comprises the digital coordinates;

selecting a color conversion matrix that corresponds to the determined local color gamut, from pre-stored color conversion matrices corresponding to the plurality of local color gamuts;

computing LAB color coordinates based on the selected color conversion matrix and the digital color coordinates; and color-measuring the image and outputting corresponding color-measured LAB color coordinates, wherein the reference matrix represents a correlation between the color-measured LAB color coordinates and the digital color coordinates.

8. The color converting method of claim 7, wherein:

the determining comprises computing temporary LAB color coordinates that correspond to each of the digital color coordinates, based on the reference matrix and the digital color coordinates; and the determined local color gamut includes the temporary LAB color coordinates.

9. The color converting method of claim 7, further comprising:

computing the reference matrix; and computing the color conversion matrices with respect to each of the plurality of local color gamuts, based on the color-measured LAB color coordinates and the digital color coordinates.

10. The color converting method of claim 9, wherein:

computing the color conversion matrices of the plurality of local color gamuts comprises using the color-measured LAB color coordinates in each of the local color gamuts and the digital color coordinates.

11. The color converting method of claim 7, wherein the local color gamuts comprise one or more chromatic regions, and one or more achromatic regions.

12. The image forming apparatus of claim 8, further comprising a comparison unit to compare the LAB color coordinates and the color-measured LAB color coordinates to compute a color difference value.

\* \* \* \* \*